United States Patent [19]

Foscante et al.

[11] 4,229,563
[45] Oct. 21, 1980

[54] AROMATIC AMIDOAMINES

[75] Inventors: Raymond E. Foscante, Yorba Linda; Albert P. Gysegem, Monrovia; Pamela J. Martinich, Long Beach, all of Calif.

[73] Assignee: Ameron, Inc., Monterey Park, Calif.

[21] Appl. No.: 63,190

[22] Filed: Aug. 3, 1979

Related U.S. Application Data

[63] Continuation of Ser. No. 835,145, Sep. 21, 1977, abandoned.

[51] Int. Cl.$^2$ .............................................. C08G 59/44
[52] U.S. Cl. ...................................... 528/99; 528/100; 528/104; 260/559 R; 260/559 S
[58] Field of Search ............. 528/99, 100; 260/559 R, 260/559 S

[56] References Cited

U.S. PATENT DOCUMENTS

| | | | |
|---|---|---|---|
| 2,703,765 | 3/1955 | Osdal | 117/75 |
| 3,140,566 | 7/1964 | Wagner | 50/536 |
| 3,183,198 | 5/1965 | Wagner | 260/18 |
| 3,301,795 | 1/1967 | Wooster | 260/2 |
| 3,382,261 | 5/1968 | Kittredge et al. | 260/404.5 |
| 3,390,124 | 6/1968 | Kittredge et al. | 260/47 |
| 3,409,591 | 11/1968 | Landua et al. | 260/47 |
| 3,595,833 | 7/1971 | Stolton | 260/47 |
| 3,639,928 | 2/1972 | Bentley et al. | 260/47 EC |
| 3,704,090 | 11/1972 | Taylor | 21/21.7 |
| 3,740,373 | 6/1973 | Bentley et al. | 260/47 EC |
| 3,753,917 | 8/1973 | Spoelder et al. | 252/182 |
| 3,799,909 | 3/1974 | Taylor | 260/47 EN |

FOREIGN PATENT DOCUMENTS

873224 4/1959 United Kingdom .
929373 7/1960 United Kingdom .
1017699 2/1964 United Kingdom .

OTHER PUBLICATIONS

Komoto et al., "Epoxy Resin Compositions", Chem. Abstracts 84, 45341n (1976).

*Primary Examiner*—Earl A. Nielsen
*Attorney, Agent, or Firm*—Christie, Parker & Hale

[57] ABSTRACT

Epoxy resins are cured with an amine adduct of orthohydroxybenzoic acid of the formula:

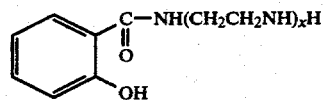

or

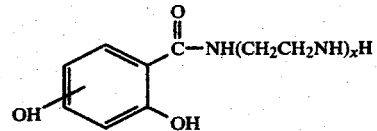

where x is from 2 to about 8.

24 Claims, 3 Drawing Figures

AROMATIC AMIDOAMINES

CROSS-REFERENCE TO RELATED APPLICATION

This is a continuation of our copending application, Ser. No. 835,145, filed Sept. 21, 1977, now abandoned.

BACKGROUND OF THE INVENTION

The amine functionality reacts relatively readily with the epoxide group to give well-cured resins, very often at room temperature. For example, aliphatic polyamines are widely used for curing epoxy resins. Aliphatic amines generally can react at room temperature with epoxy resin in bulk to give cured products in reasonable periods of time from 24 to 48 hours. The major disadvantages of aliphatic amines is that they tend to be volatile and have high irritation potential, which precludes their use in many applications for toxicological reasons. Furthermore, aliphatic amines are relatively small molecules, causing inconvenient mixing ratios relative to their use with resinous material.

Aromatic amines, while giving cured epoxy materials of good chemical and thermal resistance, do not cure conveniently at room temperature and are suspected of being highly toxic and possibly carcinogenic.

To use the advantages of the amine cure mechanism, and to overcome the disadvantages associated with aliphatic polyamines and aromatic amines, the aliphatic amine groups have been incorporated into larger molecules which decrease irritation potential and contribute some selective improvement in handling and performance properties of the product. For example, amido polyamines and fatty polyamines have been used as curing agents for epoxies. The amido polyamines are derived from the reaction of a monobasic carboxylic acid and an aliphatic amine. The acids normally employed are $C_{16}$, $C_{18}$, and $C_{19}$ fatty acid types derived from fats and oils, or copolymers of castor oil and styrene. The resulting fatty amido polyamines are low-viscosity liquids which cure according to the aliphatic polyamine and amide mechanisms.

Fatty polyamines are derived from dimerized linoleic acid and ethylenediamine or diethylenetriamine.

Fatty amido polyamines and fatty polyamines exhibit substantially the same properties. For example, both fatty amido polyamines and fatty polyamines cure bulk fatty epoxy resin at ambient temperature and convenient mixing ratios. In addition, both fatty amido polyamines and fatty polyamines exhibit reduced volatility and reduced skin irritation potential compared to aliphatic polyamines, and demonstrate good flexibility and impact strength in the cured product.

However, compared to aliphatic polyamine curing agents, the corresponding fatty amido polyamines and fatty polyamines exhibit several significant disadvantages, including poor heat strength, as exhibited by cracks resulting from casting at peak exotherms, incompatibility with many epoxy resins, requirement for catalysis of thin films for rapid ambient temperature cure, and, in general, inferior chemical and solvent resistance.

Thus, there is a need for an ambient temperature curing system for epoxy resins which:

(1) has a reasonable pot life;
(2) cures quickly to a tough film;
(3) has the advantages of aliphatic polyamines, but avoids the toxic hazards of the aliphatic polyamines and aromatic amines; and
(4) cures epoxy resins to have better heat resistance and chemical stability than epoxy resins cured with the fatty polyamines and fatty amido polyamines.

SUMMARY OF THE INVENTION

The present invention provides curing agents for epoxy resins having the above features. The curing agents of the present invention are amine adducts of ortho-hydroxybenzoic acid, the adducts having the formula:

or where x is from 2 to about 8.

Preferably, x is from 2 to about 5 for optimum cure of an epoxy resin. For an amine adduct of a dihydroxybenzoic acid, for maximum reactivity with epoxy resin, preferably both hydroxy groups are in the 2,6 (ortho) positions.

BRIEF DESCRIPTION OF THE DRAWINGS

These and other features, aspects, and advantages of the present invention will become better understood upon consideration of the appended claims, following description, and accompanying drawings, where

DETAILED DESCRIPTION

This invention relates to novel curing agents for epoxy resins, a method for curing epoxy resins with these curing agents, and the resultant polymeric product. The novel curing agents of this invention have the formula:

where x is from about 2 to about 8. In addition to these amine adducts of ortho-hydroxybenzoic acid (salicylic), the curing agents of the present invention can also be amine adducts of ortho-dihydroxybenzoic acid, having the formula:

As more fully described below, these curing agents have many desirable properties. These include the ability to react quickly at room temperature with epoxy resins to form hard, thin films, lower volatility, and hence lower irritation potential than aliphatic amines, low viscosity, water solubility, and a pot life greater than one hour. Furthermore, these curing agents produce coatings which have high thermal stability and high chemical resistance, and which are expected to have weatherability at least as good as their aliphatic analogs.

As discussed below, these amidoamines can be produced by reacting a polyamine with ortho-hydroxybenzoic acid or an ortho-dihydroxybenzoic acid. Ortho-hydroxybenzoic acid has the formula:

Ortho-dihydroxybenzoic acid has the formula:

For ease of identification, the amidoamines are identified herein by the reactants used to produce the amidoamine. For example, the aromatic amidoamine produced by reacting ortho-hydroxybenzoic acid (SA) and diethylenetriamine (DETA) is identified herein as SA/DETA and has the formula:

TABLE I presents a summary of the abbreviations used herein to identify aromatic amidoamines.

TABLE I

| GLOSSARY OF TERMS | | |
|---|---|---|
| Abbreviation | IUPAC Name | Common Name |
| BA | Benzoic acid | — |
| BAC | 1,3-bis(aminomethyl) cyclohexane | — |
| DETA | 2,2'-diaminodiethylamine | diethylenetriamine |
| IPA | 1,3-benzenedicarboxylic acid | isophthalic acid |
| MXDA | 1,3-bis(aminomethyl)benzene | meta-xylyldiamine |
| 3-OHBA | 3-hydroxybenzoic acid | — |
| 4-OHBA | 4-hydroxybenzoic acid | — |
| PA | 1,2-benzenedicarboxylic acid | phthalic acid |
| PMA | 1,2,4,5-benzenetetracarboxylic acid | pyromellitic acid |
| SA | 2-hydroxybenzoic (ortho-hydroxybenzoic) acid | salicylic acid |
| TPA | 1,4-benzenedicarboxylic acid | terephthalic acid |
| TETA | N,N'-di(2-aminoethyl)-1,2-diaminoethane | triethylenetetramine |
| TMA | 1,3,5-benzenetricarboxylic acid | trimesic acid |

The curing agents of the present invention are referred to herein as aromatic amidoamines, amine adducts of ortho-hydroxybenzoic acid, amine adducts of an ortho-dihydroxybenzoic acid, and amidoamines.

It has been found that the curing agents of the present invention are surprisingly more reactive curing agents than the corresponding amine adduct of benzoic acid, which lacks the hydroxy groups, or the hydroxybenzoic acids in which there is no hydroxy group in the ortho position. For example, it is found that SA/DETA is substantially more reactive than BA/DETA, or 4-OHBA/DETA. This higher reactivity of the curing agents of the present invention is believed to be caused by hydrogen bonding of the labile amidohydrogen with the phenoloxygen in the ortho position. This increases the acidity of the phenolhydrogen, rendering the SA/DETA molecule more active with regard to oxirane ring opening. Evidence of this increased activity is the high film hardness of polymers obtained in a very short time by reacting epoxy resin with the curing agents of this invention. This high degree of cross-linking and high degree of curing is evidence that the curing reaction has been driven to a degree not achievable in systems not having the hydroxy group substituted on the phenyl ring in the ortho position. The high degree of cross-linking may be a result of actual participation of the phenol group in the cure reaction. This would increase the cross-link density and account for the higher film hardness, higher thermal resistance, and higher chemical resistance obtained when SA/DETA replaces BA/DETA, 4-OHBA/DETA, or DETA in an epoxy resin curing system.

It is believed that the high reactivity of the curing agents of the present invention is a result of the high number of "acidic" hydrogens available for attacking an oxirane ring.

Nuclear magnetic resonance spectroscopy (NMR) provides evidence for this. To identify the number of active "acidic" hydrogens available, $D_2O$ was used as a solvent in the NMR tests. Results of these tests are presented in TABLE II.

TABLE II

| Sample Compound of Amidoamine Adduct | NMR ANALYSIS | | | |
|---|---|---|---|---|
| | Phenyl-H Actual (Theor.) | Active-H Actual (Theor.) | Methylene-H Actual (Theor.) | Solvent |
| BA/DETA | 4.9 (5.0) | 4.4 (4.0) | 7.1 (8.0) | $D_2O$ + d-acetone |
| SA/TETA | 4.0 (4.0) | 10.0 (12.0) | 5.0 (6.0) | $D_2O$ |
| TETA | — | 5.5 (6.0) | 12.9 (12.0) | $D_2O$ |
| IPA/SA/DETA | 8.0 (8.0) | 25.0 (24.0) | 13.0 (13.0) | $D_2O$ |
| BA/SA/DETA | 9.0 (9.0) | 17.5 (16.0) | 9.7 (9.0) | $D_2O$ + d-acetone |
| 4-OHBA/DETA | 4.0 (4.0) | 4.3 (4.0) | 11.7 (12.0) | $D_2O$ |

The tests shown in TABLE II indicate that all the aminohydrogens, the amidohydrogen, and the phenolic hydrogen of the curing agents of the present invention are labile (or acidic) and, hence, are capable of participation in the epoxy cure reaction.

Polyamines useful as intermediates for reaction with mono- and ortho-dihydroxybenzoic acids for preparing the curing agents of the present invention include diethylenetriamine (DETA), triethylenetetramine (TETA), tetraethylenepentamine, and so forth. These polyamines generally have the structural formula:

$$NH_2(CH_2CH_2NH)_xH$$

where x is from 2 to about 8, and preferably 2 to 5. Lower values for x are preferred for improved solvent resistance of epoxy resin cured with the amine adduct. Preferably, x is 2 or 3 for maximum curing rate; x is up to about 8 because at values greater than 8, the polyamines are more expensive, are difficult to obtain, and can be too reactive for bulk cure without using a solvent to dissipate the exothermic heat of curing. The polyamines can be branched or straight-chained. They can be substituted with aromatic groups, such as phenol. However, the phenol group cannot be bonded to a nitrogen because of toxicity problems associated with aromatic amines.

Ortho-hydroxybenzoic acid is used as an intermediate for preparing the curing agents of the present invention instead of meta- or para-hydroxybenzoic acid because the amine adducts of it exhibit surprisingly higher reactivity than the corresponding amine adducts of the meta- and para-hydroxybenzoic acids.

Preferably, the curing agents of the present invention are produced from ortho-hydroxybenzoic acid, rather than ortho-dihydroxybenzoic acid, because the monohydroxy acid costs less, and the amine adducts derived from it have about the same degree of effectiveness as the amine adducts derived from ortho-dihydroxybenzoic acid. Furthermore, it is more difficult to synthesize an amine adduct of a dihydroxybenzoic acid than the corresponding amine adduct of ortho-hydroxybenzoic acid. This is because with the dihydroxybenzoic acid the intermediates in the synthesis tend to undergo cyclization, resulting in synthesis of imidazolenes as a by-product.

Two convenient synthesis routes are available for production of the curing agents. These are:

where Ar represents a phenyl group. Synthesis route (1) is the preferred route, it being the easiest and most efficient from a processing standpoint. The amine can be used as a solvent for the reaction, with carboxylic acid added to it; in this system, the reactants are heated until a stoichiometric amount of water is evolved.

During preparation of the curing agents, an initial exothermic reaction was observed, which, based on infrared evidence, appears to involve the conversion of the amine and the carboxylic acid to the corresponding ammonium salt. Conversion of the salts to the amide is an endothermic reaction, requiring temperatures of at least about 185° C. or greater, depending on the specific reactants. This reaction is readily quenched. To determine the endpoint of the reaction, the amount of water liberated from the reaction system was monitored. As indicated by reaction (1), one mole of water is liberated per mole of each reactant.

Ortho-hydroxybenzoic acid is used as an intermediate for preparing the curing agents of the present invention, rather than a hydroxybenzene, di-, tri-, tetra-, or pentacarboxylic acid, or benzenepolycarboxylic acids, such as terephthalic acid and pyromellitic acid. This is because hydroxybenzenepolycarboxylic acids and benzenepolycarboxylic acids produce amine adducts which are either solid or too viscous to be usable as curing agents. Furthermore, these highly viscous and solid adducts cannot be blended with the curing agents of the present invention, because the resultant combinations are intractable and not completely miscible. The amidoamines of the present invention can be prepared in combination with amino adducts of ortho-hydroxybenzenepolycarboxylic acids and benzenepolycarboxylic acids by preparing both amido amines in situ. However, these combinations do not necessarily yield effective curing agents as evidenced by Example 20 presented below.

The epoxy resins suitable for use in the present invention comprise those compounds having at least two epoxy groups or oxirane rings, i.e., at least two groups.

Polyepoxides which can be used in the present invention are those described in U.S. Pat. No. 3,183,198, column 3, line 27, through column 4, line 64. This portion of U.S. Pat. No. 3,183,198 is incorporated herein by this reference.

The proportion of curing agent to epoxy resin can vary widely. In general, ratios of aromatic amidoamine curing agent to epoxy resin between about 0.5 and about 1.2 amine equivalent to 1 epoxide equivalent are suitable. "Amine equivalent" means the moles of amidoamine per active or "acidic" hydrogen. "Epoxide equivalent" means the moles of the epoxy resin per epoxy group.

It may be desirable to add a filler to the polymer compositions prepared by reacting the curing agent with an epoxy resin. Among the fillers useful in the practice of this invention are talc, silica, alumina, carbon particles, steel chips, steel filings, aluminum flakes, calcium carbonate, thixotropic agents, fibrous fillers such as asbestos, chopped glass, and barytes, and various other fillers commonly employed in combination with epoxy resins. The use of such fillers is desirable when the curing agent used with the epoxy resin is so reactive that the resulting cure reaction can be highly exothermic, causing the reaction product to char.

It is also contemplated that the curing agents of the present invention can be used in combination with conventional curing agents, such as amines, anhydrides, mercaptans, and so forth. Likewise, if additional acceleration is required, accelerators or catalysts, such as alcohols, phenols, and the like can be used.

Because the aromatic amidoamines of the present invention have a low viscosity, they can be successfully used for curing epoxy resins in a solventless or high solids system, e.g., a reaction system containing less than 10% by weight of solvent. Solvent can be used to control the rate of reaction to avoid excessive heat development by the exothermic curing reaction. The preferred solvents to be used are ketonic solvents, because they can associate with amines. Suitable ketonic solvents include methyl ethyl ketone and acetone.

The curing agents of the present invention and the polymers produced therefrom have many desirable features. In particular, the curing agents can be used for fast curing, at room temperature, epoxy resins to produce a thin film coating, i.e., a coating having a thickness of from about 1 to about 15 mils. This can be done in a high solids or solventless system and can be effected even with epoxy resins which are difficult to cure, such as cyclic aliphatic diepoxides. This thin film cure of epoxy resins can be effected without catalyst. Furthermore, the curing agents of the present invention are effective in curing epoxy resins in bulk, without charring of the reaction product. Furthermore, the curing agents are safe and easy to handle, because they have lower volatility than the corresponding polyamine, and have better mixing ratios than the corresponding polyamine.

Another advantage of the curing agents of the present invention is that they are more manageable than the corresponding hydroxybenzoic acid. For example, salicylic acid, when reacted in bulk with epoxy resins, can result in such a fast, exothermic cure that charring of the product results. On the other hand, the amine adduct of salicylic acid can be controlled to avoid such charring.

A further advantage of the curing agents of the present invention is that they exhibit a pot life in excess of one hour. In addition, they are soluble in water and thus can be used with water-based coatings.

A coating produced with the curing agent of the present invention, because of the increased cross-linked density obtained as described above, exhibits higher thermal stability and higher chemical resistance than coatings prepared with fatty amidoamines and fatty polyamides.

These and other features of the present invention will become more apparent upon consideration of the following controls and examples.

Many aromatic amidoamines were synthesized. A summary of some of those results is described below and summarized in TABLE III below.

CONTROL 1

Preparation of N,N'-di(2(2'-aminoethyl)aminoethyl)-1,3-benzenedicarboxylic acid diamide (IPA/DETA). 166 g (1 mole) of 1,3-benzenedicarboxylic acid (IPA) and 231 g (2.25 moles) of 2,2'-diaminodiethylamine (DETA) were combined in a 500 ml flask and heated slowly to 185° C. The temperature was increased after three hours, and a distillate, comprising 53 g (2.9 moles) of water and 62 g (0.6 moles) of the amine, was collected. As shown in TABLE III, the product was a solid and thus unsuitable for use as a curing agent for high-solids, thin-film epoxy applications.

CONTROL 2

Preparation of N,N'-di(2(2'-aminoethyl)aminoethyl)-phthalic acid diamide (PA/DETA). 83 g (0.5 mole) of phthalic acid and 113 g (1.1 mole) of 2,2'-diaminodiethylamine (DETA) were combined in a 250 ml flask and heated slowly to 185° C. After three hours, the temperature was increased gradually until the distillation stopped. The distillate comprised 19 g (1.06 mole) of water and 18 g (0.17 mole) of amine. As shown in TABLE III, the product was solid and thus unsuitable for use as a curing agent for high-solids, thin-film epoxy applications.

CONTROL 3

Preparation of N,N'-di(2(2'-aminoethyl)aminoethyl)-1,4-benzenedicarboxylic acid diamide (TPA/DETA). 83 g (0.5 mole) of 1,4-benzenedicarboxylic acid (TPA) and 113 g (1.1 mole) of 2,2'-diaminodiethylamine (DETA) were combined in a 250 ml flask, and 50 mls of xylene were added. The mixture was heated and the xylene distilled. 4 g (0.04 mole) of the amine distilled over with the xylene. The mixture was heated slowly to 221° C. until distillation stopped. The distillate comprised 16.5 g (0.92 mole) of water and 21.5 g (0.21 mole) of amine. The resultant product was a solid as indicated in TABLE III.

EXAMPLE 1

Preparation of N-2(2'-aminoethyl)aminoethyl-2-hydroxybenzoic acid amide (SA/DETA). 138 g (1.0 mole) of 2-hydroxybenzoic acid (SA) and 154.5 g (1.5 mole) of 2,2'-diaminodiethylamine (DETA) were combined in a 500 ml flask and heated slowly to a maximum temperature of 242° C. At about 190° C. distillation began. When 75 mls of distillate were collected, the temperature was lowered, and the reaction stopped. The distillate was redistilled from xylene and 20 g (1.1 mole) of water was collected. The product properties are presented in TABLE III.

EXAMPLE 2

Preparation of "pot blend" of phthalic acid, salicylic acid, and DETA (PA/SA/DETA). 33.2 g (0.2 mole) of 1,2-benzenedicarboxylic acid (PA), 27.6 g (1.2 mole) of a 2-hydroxybenzoic acid (PA), 27.6 g (0.2 mole) of a 2-hydroxybenzoic acid (SA), and 71.8 g (0.6 mole + 10 g) of 2,2'-diaminodiethylamine (DETA) were combined in a 250 ml flask. The temperature was increased slowly to 210° C., and 21 mls of liquid were distilled. The reaction was stopped by lowering the temperature. Azeotropic distillation of the above distillate from xylene yielded 12.5 g (0.7 mole) of water. The product properties are presented in TABLE III.

EXAMPLE 3

Preparation of "pot blend" of isophthalic acid, salicylic acid, and DETA (IPA/SA/DETA). 33.2 g (0.2 mole) of 1,3-benzenedicarboxylic acid (IPA), 27.6 g (0.2 mole) of 2-hydroxybenzoic acid (SA), and 72.1 g (0.7 mole) of 2,2'-diaminodiethylamine (DETA) were combined in a 250 ml flask and heated slowly to 230° C. During the heating, 18 mls of liquid were distilled and found, by subsequent azeotropic distillation from xylene, to contain 13.3 g (0.74 mole) of water. The reaction was stopped by removing the heat and allowing the temperature to fall to ambient. The product properties are presented in TABLE III.

EXAMPLE 4

Preparation of N,N',N'',N'''-tetra(2(2 aminoethyl)aminoethyl)-1,2,4,5-benzenetetracarboxylic acid amide (PMA/SA/DETA). 25.4 g (0.1 mole) of 1,2,4,5-benzenetetracarboxylic acid (PMA), 27.6 g (0.2 mole) of 2-hydroxybenzoic acid (SA), and 72.1 g (0.7 mole) of 2,2'-diaminodiethylamine (DETA) were combined in a 250 ml flask and heated slowly to 230° C. The heat was removed and the temperature allowed to drop after 25.5 mls of liquid were distilled from the reaction. 20.5 g of water were recovered from the distillate by azeotropic distillation from xylene. The product properties are presented in TABLE III.

EXAMPLE 5

Preparation of "pot blend" of benzoic acid, salicylic acid, DETA (BA/SA/DETA). 24.4 g (0.2 mole) of benzoic acid, 27.6 g (0.2 mole) of 2-hydroxybenzoic acid (SA), and 51.5 g (0.5 mole) of 2,2'-diaminodiethylamine (DETA) were combined in a 250 ml flask and heated slowly to 220° C. The heat was removed after 8 mls of liquid were distilled. Subsequent azeotropic distillation of this distillate from xylene was used to recover 6 g (0.33 mole) of water. The product properties are described in TABLE III.

EXAMPLE 6

Preparation of N-2(2'-aminoethyl)aminoethyl-3-hydroxybenzoic acid amide (3-OHBA/DETA). 34.5 g (0.25 mole) of 3-hydroxybenzoic acid (3-OHBA) and 41.2 g (0.4 mole) of 2,2'-diaminodiethylamine (DETA) were combined by slowly adding the acid to the amine at 100° C. The combination was heated slowly to 230° C., then removed from the heat after 6.5 mls were distilled from the reaction. The distillate was shown to be nearly all water (0.36 mole). The product properties are presented in TABLE III.

EXAMPLE 7

Preparation of N-2(2'(2''-aminoethyl)aminoethyl)aminoethyl-2-hydroxybenzoic acid amide (SA/TETA). 207 g (1.5 mole) of salicylic acid were added gradually through a powder funnel to 219 g (1.5 moles) of N,N'-di(2-aminoethyl)-1,2-diaminoethane (TETA) in a 1-liter, 3-neck flask. The reaction mixture was gradually heated during the course of the addition. Addition was complete when the pot temperature reach 100° C. The temperature was then raised to effect reaction. Boiling began at 175° C., and distillation began at 195° C. The pot temperature was then maintained at 200° C. Total reaction time was 6 hours; total water collected was 22 ml (28 ml theoretical). The product properties are presented in TABLE III.

EXAMPLES 8–15 AND CONTROL 4

These tests were conducted to demonstrate the improvement in cure rate and product hardness obtainable using curing agents of the present invention as compared to fatty acid polyamide curing agents.

Various curing agent compositions were used to cure EPON 828. EPON 828 is a normally liquid glycidyl polyether of bisphenol A, having an epoxy equivalent weight of 185–192, a viscosity at 25° C. of 5,000 to 15,000 centipoises, and is available from Shell Chemical Corporation. The curing agent composition used for each test contained varying amounts of SA/DETA, SA/TETA, and Versamid 125, which is a fatty acid polyamide made by General Mills. For Control 4, the curing agent composition was 100% Versamid 125. The results for each test is presented in TABLE IV.

TABLE IV

THE EFFECT OF SA/DETA AND SA/TETA ADDITION TO THE CURE OF EPON 828 WITH VERSAMID 125 (FATTY POLYAMIDE)

| Test No. | Curing Agent Composition (% weight) | | | Pencil Hardness | | |
|---|---|---|---|---|---|---|
| | Versamid 125 | SA/DETA | SA/TETA | 24 Hrs. | 48 Hrs. | 72 Hrs. |
| Example 8 | 90 | 10 | — | 3B | B | 4B |
| Example 9 | 90 | — | 10 | 4B | 2B | 5B |
| Example 10 | 80 | 20 | — | B | B | B |
| Example 11 | 80 | — | 20 | 2B | 2B | 2B |
| Example 12 | 60 | 40 | — | H | H | H |
| Example 13 | 60 | — | 40 | B | B | HB |
| Control 4 | 100 | — | — | >6B | 5B | 5B |
| Example 14 | — | — | 100 | B | — | 2H |
| Example 15 | — | 100 | — | B | — | 2H |

Figure 1:
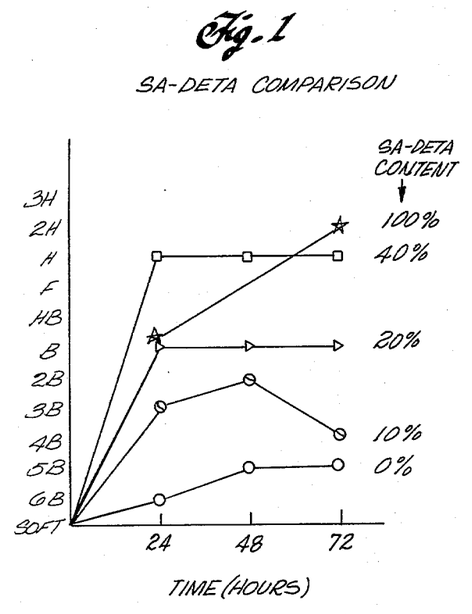
FIGS. 1, 2, and 3 present the results of tests conducted to show the effectiveness of curing agents according to the present invention in curing epoxy resins.
Figure 2:
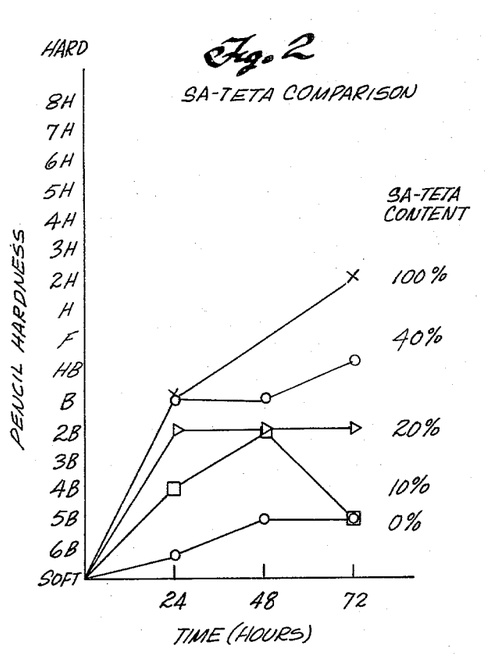

One equivalent of curing agent was used per equivalent of epoxy resin. The epoxy resin was cured in a film having a thickness of about 5 mils in a solventless system. The hardness of the film was determined after 24 hours, 48 hours, and 72 hours, except for Examples 14 and 15, where the hardness was not determined after 48 hours. The hardness tests in TABLE IV represent the softest pencil which would not indent the coating. FIGS. 1 and 2 present the results of these tests in graphic form.

As shown by the results presented in TABLE IV and FIGS. 1 and 2, the curing agents of the present invention cure EPON 828 substantially faster and to a substantially higher hardness than Versamid 125.

CONTROLS 5 AND 6

Using the same procedures used for Examples 8–15 and Control 4, films of EPON resin were prepared using DETA for Control 5 and TETA for Control 6 as the curing agent. The hardness obtained after 24 and 72 hours is presented in TABLE V, along with the results of Examples 14 and 15.

TABLE V

| | CURE OF EPON 828 | | |
|---|---|---|---|
| | Cure System | Hardness | |
| Test No. | (Equivalent Mixture) | 24 Hrs. | 72 Hrs. |
| Example 15 | SA/DETA | B | 2H |
| Control 5 | DETA | Soft | H |
| Example 14 | SA/TETA | B | 2H |
| Control 6 | TETA | Soft | H |

These results show that curing agents of the present invention yield a harder cure and a faster cure than the corresponding polyamine.

EXAMPLES 16–21 AND CONTROL 7

A variety of polymers were prepared by curing either DER 332, EPON 812, or mixtures of the two, with aromatic amidoamine curing agents according to the present invention for Examples 16–21, and with TMA/DETA for Control 7. DER 332 is a bifunctional, low molecular weight diglycidyl ether of bisphenol A, manufactured by Dow Chemical Company, and having similar properties to EPON 828. EPON 812 is a trifunctional, low-viscosity aliphatic epoxy resin, a triglycidyl ether of glycerol, manufactured by Shell Chemical Company. The filler used was barytes (barium sulfate). The formulation, bulk cure time, thin-film cure time, cure temperature, film hardness initially (at the thin-film cure time), and after 72 hours, and comments regarding each polymer product are presented in Table VI.

TABLE VI
AROMATIC AMIDOAMINE EPOXY CURING AGENTS

| Test No. | Amidoamine (Equiv; pbw) | DER 332 (Equiv; pbw) | EPON 812 (Equiv; pbw) | Filler (BaSO4) (pbw) | Bulk Cure Time | Thin Film Cure Time (Hrs.) | Cure Temp. (°C.) | Thin Film Hardness (initial, 72 Hrs.) | Comments |
|---|---|---|---|---|---|---|---|---|---|
| Example 16 | SA/DETA (1;55) | 0.5; 85 | 0.5; 75 | 250 | 5 mins. | 2.5 | 25 | (6H,6H) | Excel. film; highly reactive. Bulk exoth. problem |
| Example 17 | SA/DETA (1;59) | 1; 170 | 0 | 250 | 1.25 hr. | 3.0 | 25 | (3H,3H) | Excel. film; highly reactive. Bulk exoth. problem |
| Control 7 | TMA/DETA (1;52) | 0.5; 85 | 0.5; 75 | 250 | Not cured | Not cured | 25 | Soft | Reaction occurs; poor film formation |
| Example 18 | PA/SA/DETA (1;62) | 0.5; 85 | 0.5; 75 | 250 | 12 mins. | 12.0 | 25 | Soft | Poor reaction |
| Example 19 | 4-OHBA/DETA (1;140) | 1.0; 170 | 0 | 250 | 0.5 hr. | 3.0 | 25 | Soft | Slow conversion at ambient |
| Example 20 | PMA/SA/DETA (1;66) | 0.5; 85 | 0.5; 75 | 250 | — | No RXN | 25 | No RXN | Ineffective as curative |
| Example 21 | BA/SA/DETA (1;107) | 1.0; 170 | 0 | 250 | 20 mins. | 2.5 | 25 | (—,4H) | Hard cure occurs; excel. results |
| Example 16 | SA/DETA (1;55) | 0.5; 85 | 0.5; 75 | 250 | 5 mins. | 2.5 | 25 | (6H,6H) | Excel. film; highly reactive. Bulk exoth. problem |
| Example 17 | SA/DETA (1;59) | 1; 170 | 0 | 250 | 1.25 hr. | 3.0 | 25 | (3H,3H) | Excel. film; highly reactive. Bulk exoth. problem |
| Control 7 | TMA/DETA (1;52) | 0.5; 85 | 0.5; 75 | 250 | Not cured | Not cured | 25 | Soft | Reaction occurs; poor film formation |
| Example 18 | PA/SA/DETA (1;62) | 0.5; 85 | 0.5; 75 | 250 | 12 mins. | 12.0 | 25 | Soft | Poor reaction |
| Example 19 | 4-OHBA/DETA (1;140) | 1.0; 170 | 0 | 250 | 0.5 hr. | 3.0 | 25 | Soft | Slow conversion at ambient |
| Example 20 | PMA/SA/DETA (1;66) | 0.5; 85 | 0.5; 75 | 250 | — | No RXN | 25 | No RXN | Ineffective as curative |
| Example 21 | BA/SA/DETA (1;107) | 1.0; 170 | 0 | 250 | 20 mins. | 2.5 | 25 | (—,4H) | Hard cure occurs; excel. results |

The bulk cure time given in TABLE VI is practically the same as pot life, because once a bulky mass of the composition gels, the heat from the exothermic reaction is so great that the temperature rises dramatically, causing almost an instantaneous complete cure at a temperature far above ambient. In fact, the temperature rose so rapidly in some instances that the containers for the material melted.

The thin-film cure time refers to the time required for the material to gel sufficiently to permit it to be touched without disturbing the film. Although the 4-OHBA/DETA (Example 19) had the same thin-film cure time as the SA/DETA (Example 17) and a shorter pot life, the 4-OHBA/DETA still failed to harden satisfactorily, even after 72 hours. The SA/DETA, on the other hand, achieved a relatively high hardness of 3 H within only three hours.

The results in TABLE VI show that best curing properties and best final product properties are obtained when SA/DETA is used as the curing agent. Surprisingly, the 4-OHBA/DETA curing agent (Example 19) is not satisfactory because of its short pot life, and because it does not cure in a thin film at room temperature in a reasonable time (72 hours).

EXAMPLE 22 AND CONTROLS 8-10

These tests were conducted to compare the thermal stability of epoxy resin cured with SA/DETA, a curing agent of the present invention (Example 22), with the thermal stability of epoxy resin cured with BA/DETA (Control 8), with DETA alone (Control 9), and with a conventional polyurethane (Control 10). For Example 22, and Controls 8 and 9, one equivalent of curing agent was used per equivalent of epoxy resin, each equivalent of epoxy resin consisting of one-half equivalent of EPON 812 and one-half equivalent of DER 332. Each cured epoxy resin included 50% by weight barium sulfate. Thermal stabilities were compared by thermal gravimetric analysis (TGA). This method provides a measure of weight loss as a function of increasing temperature. The weight loss is usually attributable to the loss of volatile components (e.g., solvent evaporation), loss of occluded water, and thermal decomposition. Weight loss was measured at 100°, 200°, 300°, 400°, and 500° C. The results are presented in Table VII.

TABLE VII
THERMAL STABILITIES

| Test No. | Curing Agent | WEIGHT LOSS (% of initial weight) | | | | |
|---|---|---|---|---|---|---|
| | | 100° C. | 200° C. | 300° C. | 400° C. | 500° C. |
| Example 22 | SA/DETA | 1.3 | 2.7 | 6.7 | 37.3 | 42.7 |
| Control 8 | BA/DETA | 0 | 1.6 | 9.5 | 49.2 | 55.5 |
| Control 9 | DETA | 1.0 | 2.0 | 12.0 | 60.0 | 68.07 |
| Control | Poly- | | | | | |

TABLE VII-continued
THERMAL STABILITIES

| Test No. | Curing Agent | WEIGHT LOSS (% of initial weight) | | | | |
|---|---|---|---|---|---|---|
| | | 100° C. | 200° C. | 300° C. | 400° C. | 500° C. |
| 10 | urethane | 3.2 | 3.9 | 14.9 | 45.7 | 51.1 |

Figure 3:
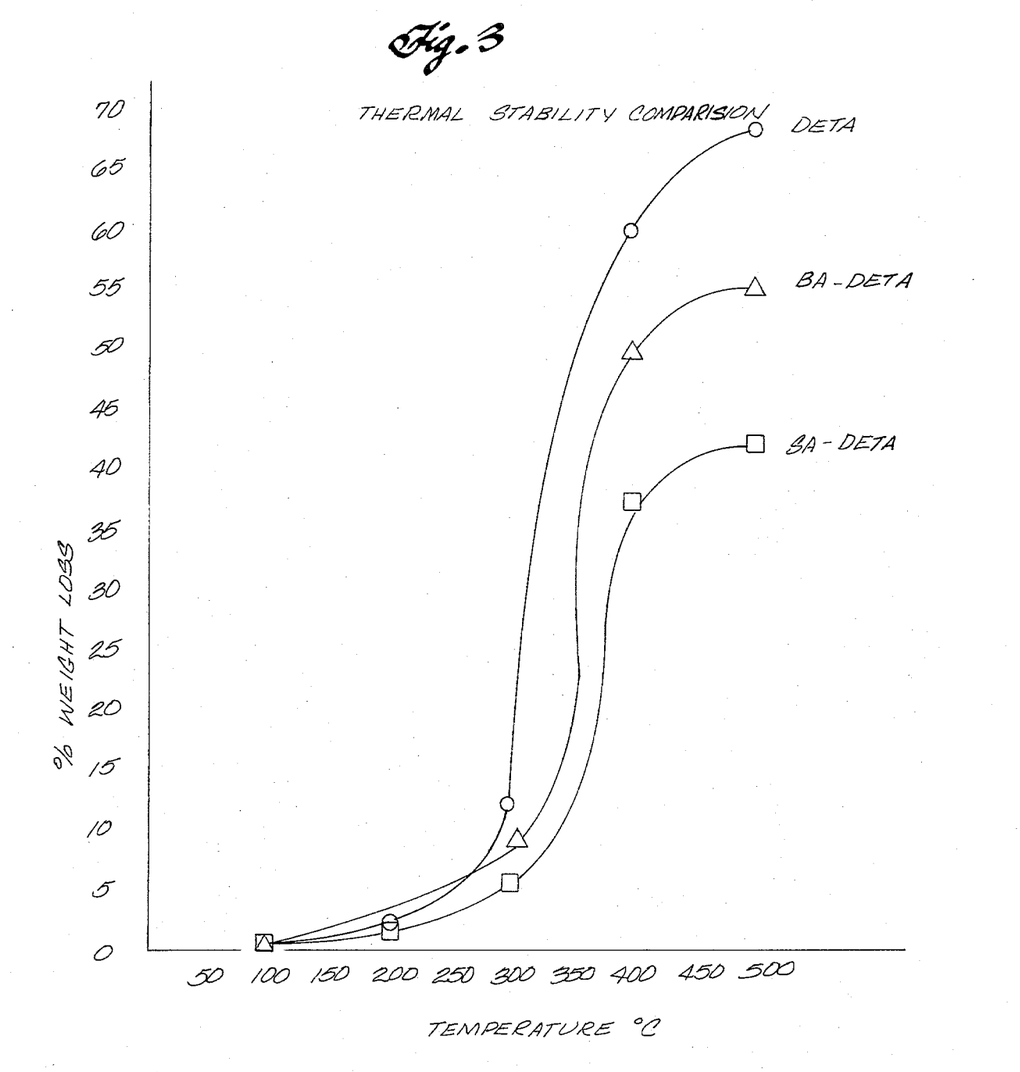

Weight loss in the low temperature range (less than 150° C.) is attributable more to the evaporation of water and/or volatile contaminants normally found in the starting materials than to actual thermal degradation. Cured epoxy resins and, in fact, most organic resin systems, are not normally stable above 200° C. (using a weight loss of 5% as a convenient measure of thermal stability). Exceptions include highly aromatic systems where the benzene ring is an integral part of the backbone. Hence, the carbon-carbon bond in the polymer backbone is the major limiting factor in determining the thermal stability of a cured epoxy resin. Minor improvement or variations can be made by selection of curatives. This is noted by comparison of the results of Example 22 with the results of Controls 8 and 9. The aromatic amidoamine of Example 22 improves thermal stability in the 200°–300° C. range compared to the analogous polyamine-cured formulation. This is clearly shown in FIG. 3, which presents the results of Example 22 and Controls 8 and 9. The practical effect of this improvement in thermal stability attributable to the aromatic amidoamine is significant. By judicious choice of fillers, the thermal service range of epoxy formulations based on DGEBA can be increased to 300° C., which is at least 50° C. higher than possible with a polyamine. In addition, the results indicate the activation energy for decomposition to be higher. Therefore, epoxy resin subjected to thermal cycling within the service range will be less subject to failure.

EXAMPLES 23 AND 24 AND CONTROL 11

These tests were conducted to demonstrate that better solvent resistance can be obtained by curing epoxy resin with curing agents of the present invention than with prior art curing agents.

EPON 828 was cured with stoichiometric quantities of the curative indicated in TABLE VIII containing no fillers or solvent.

TABLE VIII
EFFECT OF SOLVENT ON FILM HARDNESS FOR EPON 828 CURED WITH VARYING ALIPHATIC AND AMIDOAMINE CURATIVES

| Test No. | Curing Agent | Pencil Hardness of Thin Film | Pencil Hardness After Xylene Spot Test |
|---|---|---|---|
| Control 11 | DETA | H | Too soft, All scratched. Less than 6B |
| Example 23 | SA/DETA | H | H |
| Example 24 | SA/TETA | H | B |

As shown in TABLE VIII, no change in film hardness was noted for SA/DETA after exposure to xylene. SA/TETA showed slight softening (H—>B), while the DETA-cured sample was not resistant at all. Two structure-property relationships are implied by these observations: (1) the presence of the aromatic ring does impart solvent resistance to an otherwise nonresistant cure system (DETA vs. SA/DETA); and (2) the length of the aliphatic amine chain does affect solvent resistance; that is, the longer the chain, the less the resistance (SA/DETA vs. SA/TETA).

We claim:

1. An amine adduct of orthohydroxybenzoic acid of the formula:

where x is from 2 to about 8, and the hydroxyl group is in the ortho position.

2. The adduct of claim 1 wherein x is from 2 to 5.

3. The adduct of claim 1 wherein x is from 2 to 3.

4. An amine adduct of a dihydroxybenzoic acid of the formula:

where x is from 2 to about 8, and one of the hydroxyl groups is in the ortho position.

5. The adduct of claim 4 wherein x is from 2 to 5.

6. The adduct of claim 4 in which both hydroxyl groups are in the ortho position.

7. A method for preparing a polymeric product comprising the step of curing an epoxy resin with a curing agent having the formula:

where x is from 2 to about 8.

8. The method of claim 7 in which the epoxy resin is cured as a film having a thickness of from about 0.001 to about 0.015 inch.

9. The method of claim 7 wherein x is from 2 to 5.

10. The method of claim 7 wherein x is from 2 to 3.

11. A method for preparing a polymeric product comprising the step of curing an epoxy resin with a curing agent having the formula:

where x is from about 2 to about 8.

12. A method according to claim 11 in which both hydroxyl groups are in the ortho position.

13. The method of claim 11 wherein x is from 2 to 3.

14. A polymeric resin composition comprising an epoxy resin cured in the presence of a curing agent having the formula:

where x is from 2 to about 8.

15. The composition of claim 14 where x is from 2 to 5.

16. The composition of claim 14 where x is from 2 to 3.

17. A polymeric resin composition comprising an epoxy resin cured in the presence of a curing agent having the formula:

where x is from 2 to about 8.

18. A resin according to claim 17 in which both hydroxyl groups are in the ortho position.

19. The composition of claim 17 where x is from 2 to 5.

20. A resin composition curable at room temperature comprising:
(1) an epoxy resin; and
(2) a curing agent having the formula:

where x is from 2 to about 8.

21. The composition of claim 20 where x is from 2 to 5.

22. The composition of claim 20 where x is from 2 to 3.

23. A resin composition curable at room temperature comprising:
(1) an epoxy resin; and
(2) a curing agent having the formula:

where x is from 2 to about 8.

24. A composition according to claim 23 in which both hydroxyl groups are in the ortho position.

* * * * *

UNITED STATES PATENT AND TRADEMARK OFFICE
CERTIFICATE OF CORRECTION

PATENT NO. : 4,229,563  
DATED : October 21, 1980  
INVENTOR(S) : RAYMOND E. FOSCANTE ET AL It is certified that error appears in the above—identified patent and that said Letters Patent is hereby corrected as shown below:

Col. 5, line 16, "meta- or para-" should read -- meta- or para- --  
       line 19, "meta- and para-" should read -- meta- and para- --  
Col. 8, line 47, "aminoethyl-" should read -- aminoethyl) --  
       line 48, ")aminoethyl)" should read -- aminoethyl) --  
Col. 9, line 17, ")aminoethyl-" should read -- aminoethyl) --  
       line 18, ")aminoethyl-" should read -- aminoethyl- --  
       line 33, insert the following TABLE III

TABLE III

AROMATIC AMIDOAMINE SYNTHESIS SUMMARY

| Test No. | Acid | Amine | Reaction Temperature (°C) | Water Evolved (Mole Ratio) | Amine Value* Actual | Amine Value* Theor. | Vicosity | Comments |
|---|---|---|---|---|---|---|---|---|
| Control 1 | IPA | DETA | 185 | 2 | 84 | 84 | Solid | IR indicates complete acid conversions |
| Control 2 | PA | DETA | 185 | 2 | — | 84 | Solid | IR indicates complete acid conversions |
| Control 3 | TPA | DETA | 221 | 2 | 110 | 84 | Solid | IR indicates complete acid conversions |
| Example 1 | SA | DETA | 242 | 1.1 | 102 | 111 | Fluid | Yellow clear liquid |
| Example 2 | SA/PA | DETA | 210 | 0.7 | 102 | 140 | Viscous | Viscous brown liquid |
| Example 3 | IPA/SA | DETA | 230 | 0.74 | 71 | 140 | Viscous | Viscous orange liquid |
| Example 4 | PMA/SA | DETA | 230 | 1 | 123 | — | Viscous | Viscous brown liquid |
| Example 5 | BA/SA | DETA | 220 | — | 78 | 108 | Viscous | Viscous yellow liquid |
| Example 6 | 3-OHBA | DETA | 230 | 1 | — | 123 | Viscous | Viscous brown liquid |
| Example 7 | SA | TETA | 200 | 1 | 67 | 88 | Moderate | Residual amine left in product; not removed due to high boiling point |

*ASTM, D-2073-66, "Book of ASTM Standards", 29, 279 (1975)

UNITED STATES PATENT AND TRADEMARK OFFICE
CERTIFICATE OF CORRECTION

PATENT NO. : 4,229,563

DATED : October 21, 1980

INVENTOR(S) : RAYMOND E. FOSCANTE ET AL

It is certified that error appears in the above—identified patent and that said Letters Patent is hereby corrected as shown below:

Cols. 11 and 12, cancel lines 23-38.

Signed and Sealed this

Eighth Day of September 1981

[SEAL]

Attest:

Attesting Officer

GERALD J. MOSSINGHOFF

Commissioner of Patents and Trademarks